United States Patent
Baek et al.

(10) Patent No.: US 7,774,581 B2
(45) Date of Patent: Aug. 10, 2010

(54) APPARATUS FOR COMPRESSING INSTRUCTION WORD FOR PARALLEL PROCESSING VLIW COMPUTER AND METHOD FOR THE SAME

(75) Inventors: Chang-Woo Baek, Hwaseong-si (KR); Hong-Seok Kim, Seongnam-si (KR); Hee Seok Kim, Seoul (KR); Jeongwook Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 351 days.

(21) Appl. No.: 11/838,511

(22) Filed: Aug. 14, 2007

(65) Prior Publication Data

US 2008/0235492 A1   Sep. 25, 2008

(30) Foreign Application Priority Data

Mar. 23, 2007  (KR) .................... 10-2007-0028813

(51) Int. Cl.
   *G06F 9/30*   (2006.01)
(52) U.S. Cl. .................... 712/24; 712/204; 712/206
(58) Field of Classification Search .............. 712/24, 712/204, 206
   See application file for complete search history.

(56) References Cited

U.S. PATENT DOCUMENTS

| | | | | |
|---|---|---|---|---|
| 5,819,058 A | * | 10/1998 | Miller et al. | 712/210 |
| 5,893,143 A | * | 4/1999 | Tanaka et al. | 711/120 |
| 6,044,450 A | * | 3/2000 | Tsushima et al. | 712/24 |
| 6,275,921 B1 | * | 8/2001 | Iwata et al. | 712/24 |
| 6,321,318 B1 | | 11/2001 | Baltz et al. | |
| 6,859,870 B1 | * | 2/2005 | Kim et al. | 712/24 |
| 7,290,122 B2 | * | 10/2007 | May et al. | 712/224 |
| 7,409,530 B2 | * | 8/2008 | Kim et al. | 712/24 |
| 2001/0047466 A1 | * | 11/2001 | Topham | 712/226 |
| 2004/0019762 A1 | * | 1/2004 | Fukuoka et al. | 711/203 |
| 2005/0050300 A1 | * | 3/2005 | May et al. | 712/24 |
| 2005/0102489 A1 | * | 5/2005 | Kim et al. | 712/24 |

FOREIGN PATENT DOCUMENTS

| | | |
|---|---|---|
| JP | 55-116141 A | 9/1980 |
| JP | 02-081228 A | 3/1990 |
| JP | 11-085512 A | 3/1999 |
| JP | 2000-081982 A | 3/2000 |
| KR | 100057817 B1 | 12/1992 |
| KR | 1020010050693 A | 6/2001 |
| KR | 1020020003882 A | 1/2002 |

* cited by examiner

*Primary Examiner*—Aimee J Li
(74) *Attorney, Agent, or Firm*—Sughrue Mion, PLLC

(57) ABSTRACT

An apparatus and a method are provided for a parallel processing very long instruction word (VLIW) computer. The apparatus includes: an index code generation unit sequentially generating an index code, which is associated with a number of no operation (NOP) instruction word between effective instruction words, with respect to each of instruction word groups to be executed in a VLIW computer; an instruction compression unit sequentially deleting the NOP instruction word which corresponds to the index code with respect to each of instruction word groups; and an instruction word conversion unit converting the effective instruction words to include the index code, the effective instruction words corresponding to the NOP instruction words.

15 Claims, 7 Drawing Sheets

X : DON'T CARE

X : DON'T CARE

APPARATUS FOR COMPRESSING INSTRUCTION WORD FOR PARALLEL PROCESSING VLIW COMPUTER AND METHOD FOR THE SAME

CROSS-REFERENCE TO RELATED APPLICATION

This application claims priority from Korean Patent Application No. 10-2007-0028813, filed on Mar. 23, 2007, in the Korean Intellectual Property Office, the entire disclosure of which is incorporated herein by reference.

BACKGROUND OF THE INVENTION

1. Field of the Invention

Methods and apparatuses consistent with the present invention relate to an instruction set architecture (ISA) on a computer architecture. More particularly, the present invention relates to an instruction word compression apparatus and an instruction word compression method for a very long instruction word (VLIW) computer.

2. Description of Related Art

A very long instruction word (VLIW) computer includes a plurality of functional units which simultaneously executes instruction words, and is configured in a computer architecture capable of reducing a requirement for executing all instructions by distributing input instruction words to functional units.

A number of instruction words which can be executed simultaneously are determined by a number of the plurality of functional units, and a number of effective instruction words, which can be simultaneously executed at each execution time, may be less than an ideal maximum number due to dependency between input effective instruction words.

In this instance, a no operation (NOP) instruction word is allocated to a functional unit that is not being operated at each execution time, and thereby a number of instruction words required to be stored at each execution time is increased. Accordingly, a study regarding an instruction compression method has been made to reduce additional storage space. An end code that informs about an end of an effective instruction group and a parallel bit are used in the instruction compression method.

However, with respect to the end code, a complex instruction allocation logic is required, and a size of the end code is too great. The parallel bit may not be applicable to a method of allocating a functional unit for an instruction based on a location of the instruction within an instruction group. Also, an interconnect network is additionally required for the parallel bit. The interconnect network sends an instruction to be executed to the functional unit which supports the instruction to be executed. The implementation of the parallel bit is significantly complex.

Accordingly, with respect to the parallel processing VLIW computer, a more effective instruction word compression method is earnestly required.

SUMMARY OF THE INVENTION

An aspect of the present invention provides an instruction word compression apparatus and an instruction word compression method which can reduce a storage space for an instruction without requiring an additional storage space or an additional circuit logic while still having an advantage of a parallel processing VLIW computer.

Another aspect of the present invention also provides an instruction word compression apparatus and an instruction word compression method which can acquire an instruction word set that is optimal for performance in a parallel function unit in a parallel processing VLIW computer.

According to an aspect of the present invention, there is provided an instruction word compression apparatus including: an index code generation unit sequentially generating an index code, which is associated with a number of no operation (NOP) instruction words between effective instruction words, with respect to each of instruction word groups to be executed in a very long instruction word (VLIW) computer; an instruction compression unit sequentially deleting the NOP instruction words which correspond to the index code with respect to the each of instruction word groups; and an instruction word conversion unit converting the effective instruction words to include the index code, the effective instruction words corresponding to the NOP instruction words.

According to another aspect of the present invention, there is provided an instruction word compression method: sequentially generating an index code, which is associated with a number of no operation (NOP) instruction words between effective instruction words, with respect to each of instruction word groups to be executed in a very long instruction word (VLIW) computer; sequentially deleting the NOP instruction words which correspond to the index code, with respect to the each of instruction word groups; and converting at least one of the effective instruction words to include the index code, the effective instruction words corresponding to the deleted NOP instruction word.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
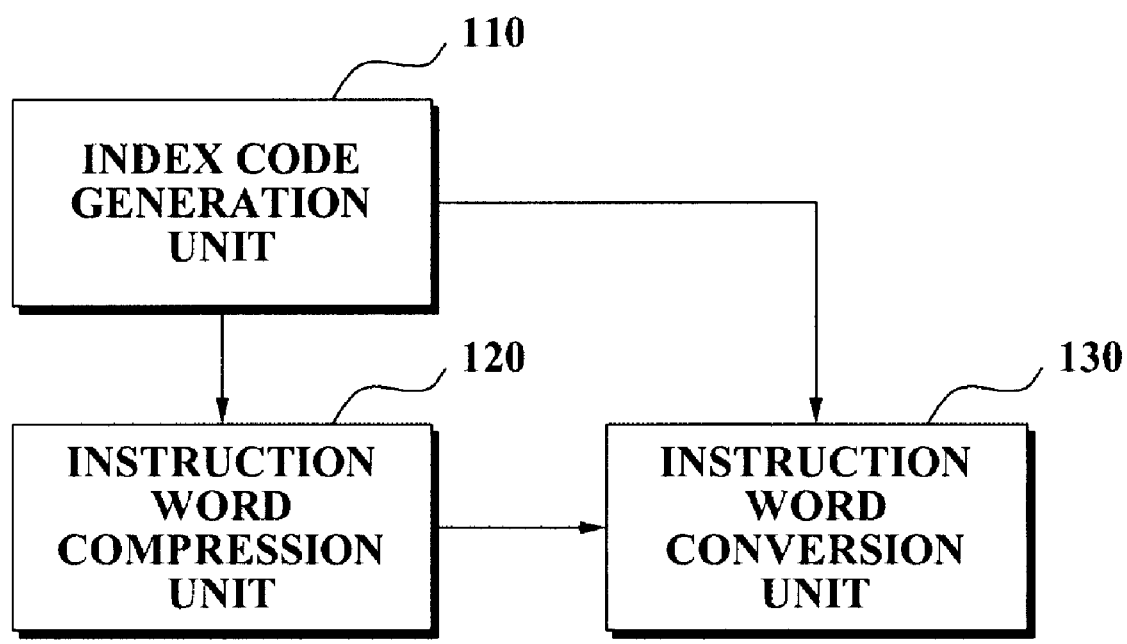
FIG. 1 is a block diagram illustrating an instruction word compression apparatus according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating an instruction word compression apparatus according to an exemplary embodiment of the present invention.

Referring to FIG. 1, the instruction word compression apparatus according to an exemplary embodiment of the present invention includes an index code generation unit 110, an instruction word compression unit 120, and an instruction word conversion unit 130.

The index code generation unit 110 sequentially generates an index code, which is associated with a number of no operation (NOP) instruction words between effective instruction words, with respect to each of instruction word groups to be executed in a very long instruction word (VLIW) computer.

In the instruction word group, a NOP instruction word indicates an instruction word which corresponds to a case of executing no operation at a predetermined execution time, and an effective instruction word indicates all instruction words except the NOP instruction word.

The VLIW computer has a computer architecture capable of reducing the total execution time of an instruction by including functional units to simultaneously execute instruction words, and by distributing input instruction words to functional units.

A number of instruction words is determined by a number of functional units, and a number of effective instruction words that can be simultaneously executed at each execution time may be less than an ideal maximum number due to dependency between input effective instruction words.

In this instance, an instruction word group consisting of instruction words being simultaneously executed at each execution time may exist. The number of the effective instruction words is less than the ideal maximum number due to the dependency, may be included. The NOP instruction words may be included in remaining space.

The instruction word compression unit 120 sequentially deletes the NOP instruction words which correspond to the index code with respect to the each of instruction word groups.

In this instance, each instruction word group having deleted NOP instruction words may include fewer instruction words than initial instruction word groups.

In this instance, the number of the NOP instruction words being associated with the index code may be limited by a size of the index code.

When the index code consists of two bits, a number of NOP instruction words that can be indicated by the index code may range from zero to three bits.

In this instance, the sequentially deleted NOP instruction words are limited by the index code, because the NOP instruction words may be deleted within a range that the index code indicates.

When five NOP instruction words exist between the effective instruction words, and when the number of the NOP instruction words that can be indicated by the index code ranges from zero to three, the sequentially deleted NOP instruction words correspond to an initial three NOPs from a head, and a final two NOPs from a tail remain.

The instruction word conversion unit 130 converts the effective instruction words to include the index code, the effective instruction words corresponding to the deleted NOP instruction words.

In this instance, the number of the NOP instruction word being associated with the index code may be limited by a size of the index code.

In this instance, the instruction word conversion unit 130 may include a remaining NOP manipulator, the remaining NOP manipulator manipulates a remaining NOP instruction word to include a predetermined index code. The remaining NOP instruction word remained after sequentially deleting the NOP instruction words.

When five NOP instruction words exist between the effective instruction words, and when a number of the NOP instruction words that can be indicated by the index code, ranges from zero to three. The sequentially deleted NOP instruction words correspond to an initial three NOPs from a head, and a final two NOPs from a tail remain.

The remaining NOP manipulator manipulates the remaining two NOP instruction words to include the index code.

The predetermined index code may be an index code corresponding to when a number of the NOP instruction word is zero.

In this instance, the instruction word conversion unit 130 converts the effective instruction word to include the index code, the effective instruction word is located prior to the deleted NOP instruction word.

The instruction word conversion unit 130 converts the effective instruction word to include the index code, the effective instruction word is located prior to the deleted three NOPs, when the three NOPs between two effective instruction words are deleted.

In this instance, a size of instruction word groups is equal to a maximum number of instruction words that can be simultaneously executed in the computer.

The VLIW computer has a computer architecture capable of reducing total execution time of instruction by including functional units to simultaneously execute instruction words, and by distributing input instruction words to functional units.

A number of instruction words that can be simultaneously executed in the VLIW computer is determined by a number of the functional units.

In this instance, the index code may include a predetermined code which indicates to that all remaining instruction words are NOP instruction words.

For example, when the index code consists of two bits, and when the index code has a value of "01", this value denotes that instruction words locating after the effective instruction words in the instruction word group are all NOP instruction words.

In this instance, a size of the index code may be previously determined based on at least one of an architecture of an instruction word and an operation environment of the computer.

The size of the index code may be previously determined before the instruction word is executed.

The size of the index code may be previously determined based on a size of the instruction word or a size of each area being allocated to within the instruction word.

In this instance, the instruction conversion unit 130 may substitute a part of the effective instruction words with the index code.

The instruction conversion unit 130 may substitute the part of the effective instruction words with the index code.

Figure 2:
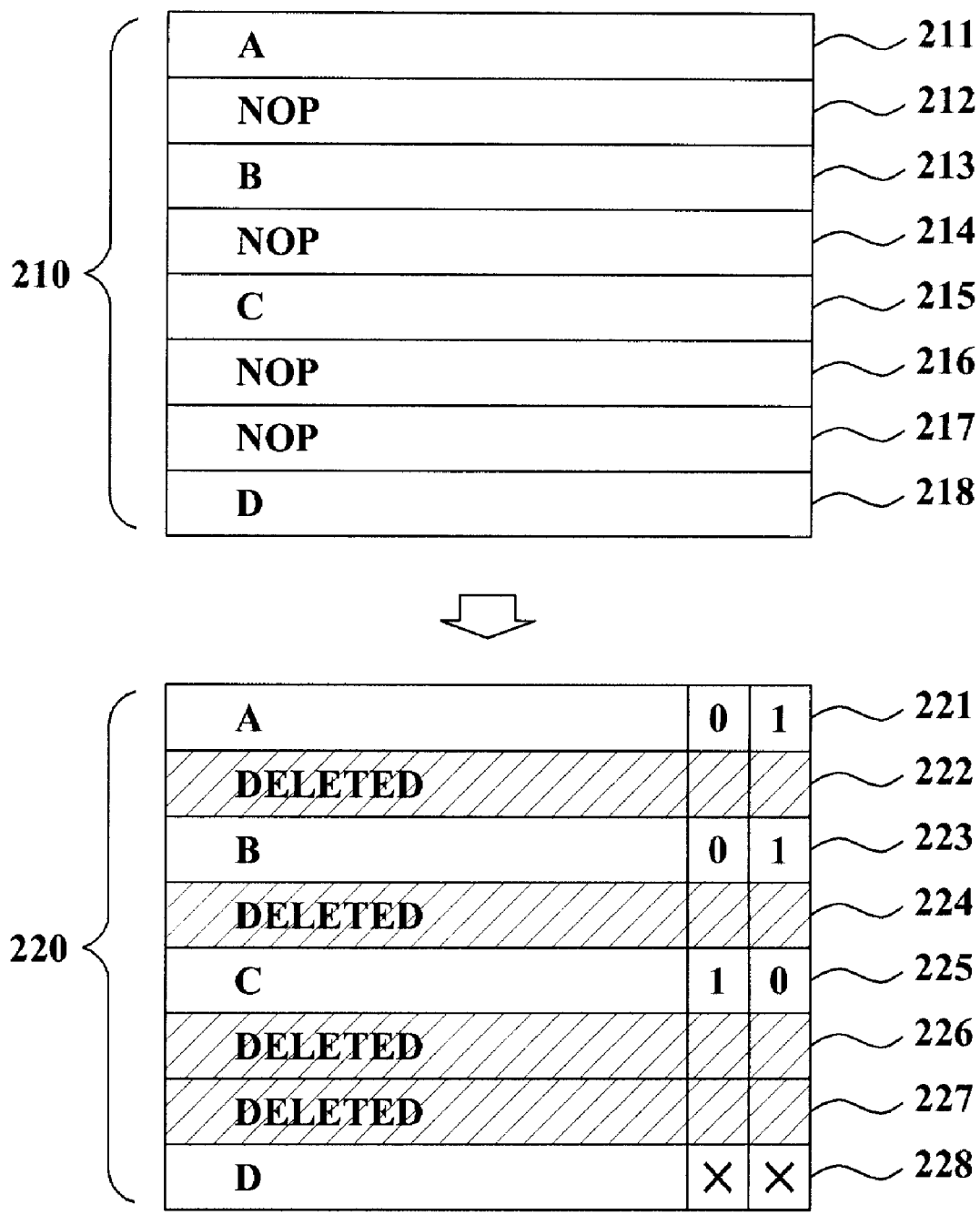
FIG. 2 is a diagram illustrating operations where an instruction word group is compressed by an instruction word compression apparatus according to an exemplary embodiment of the present invention.

FIG. 2 is a diagram illustrating operations where an instruction word group 210 is compressed by an instruction word compression apparatus according to an exemplary embodiment of the present invention.

Referring to FIG. 2, the instruction word group 210 includes eight instruction words 211, 212, 213, 214, 215, 216, 217, and 218.

An index code is generated with respect to NOP instruction words 212, 214, 216, and 217, and the NOP instruction words 212, 214, 216, and 217 are deleted.

A compressed instruction word group 220 includes four effective instruction words 221, 223, 225, and 228, and excludes deleted four NOP instruction words 222, 224, 226, and 227, which are associated with the four NOP instruction words 212, 214, 216, and 217.

Since one NOP 212 exists between the first effective instruction word 211 and the second effective instruction word 213, a generated index code is "01", the index code "01" is included in the effective instruction word 211 existing prior to the deleted NOP instruction word 212, and thereby the first effective instruction word 221 is generated in the compressed instruction word group 220.

Since one NOP 214 exists between the second effective instruction word 213 and the third effective instruction word 215, a generated index code is "01".

And the index code "01" is included in the effective instruction word 213 existing prior to the deleted NOP instruction word 214, and thereby the second effective instruction word 223 is generated in the compressed instruction word group 220.

Since two NOP, 216 and 217, exists between the third effective instruction word 215 and the fourth effective instruction word 218, a generated index code is "10".

And the index code "10" is included in the effective instruction word 215 existing prior to the deleted NOP instruction words 216 and 217 and thereby the third effective instruction word 225 is generated in the compressed instruction word group 220.

Since the fourth effective instruction word 218 is a last instruction word, an NOP instruction word can not exist after the fourth effective instruction word 218. Accordingly, an index code includes the fourth effective instruction word 228 in the compressed instruction word group 220 may take any one value of "00", "01", "10", and "11".

Figure 3:
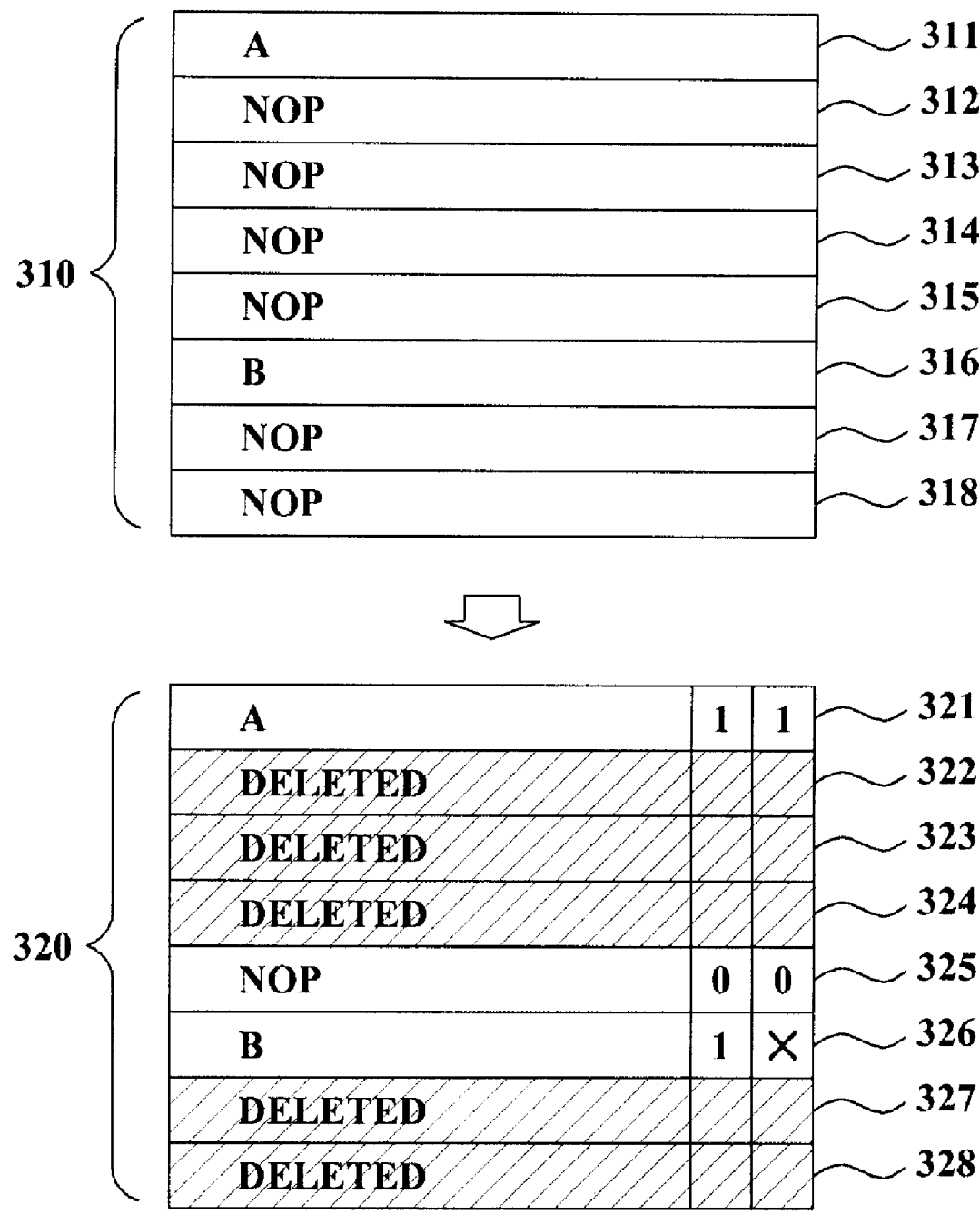
FIG. 3 is a diagram illustrating operations where an instruction word group is compressed by an instruction word compression apparatus according to another exemplary embodiment of the present invention.

FIG. 3 is a diagram illustrating operations where an instruction word group 310 is compressed by an instruction word compression apparatus according to another exemplary embodiment of the present invention.

Referring to FIG. 3, the instruction word group 310 includes eight instruction words 311, 312, 313, 314, 315, 316, 317, and 318.

An index code is generated with respect to the NOP instruction words 312, 313, 314, 317, and 318, and the NOP instruction words 312, 313, 314, 317, and 318 are deleted.

A compressed instruction group 320 includes three instruction words 321, 325, and 326, and excludes deleted five NOP instruction words 322, 323, 324, 327, and 328, which are associated with the five NOP instruction words 312, 313, 314, 317, and 318.

Since four NOP instruction words 312, 313, 314, and 315 exists between the first effective instruction word 311 and the second effective instruction word 316 and since a size of an index code is two bits, the three NOP instruction words 312, 313, and 314 are sequentially deleted and an index code "11" is generated. The index code is included in the effective instruction word 311 existing prior to the deleted NOP instruction words 312, 313, and 314, and the first instruction word 321 is generated in the compressed instruction word group 320.

A predetermined index code "00" is included in the undeleted NOP instruction word 315, and the second instruction word 325 is generated in the compressed instruction word group 320.

Since two NOP instruction words 317 and 318 exists after the second effective instruction word 316, an index code "10" is generated. The index code "10" included in the effective instruction word 316 existing prior to the deleted NOP instruction words 317 and 318, and the third instruction word 326 is generated in the compressed instruction word group 320. Since a group is terminated by the two NOP instruction words 317 and 318 existing after the second effective instruction word 316, an index code included in the third instruction word 326 may be "11".

Figure 4:
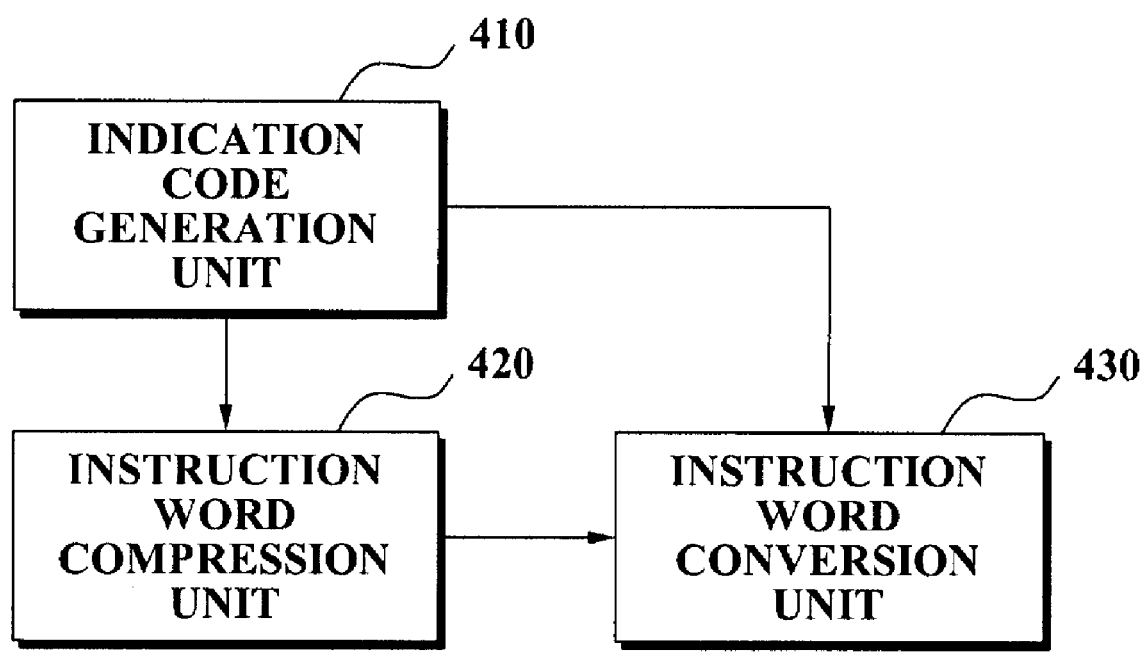
FIG. 4 is a block diagram illustrating an instruction word compression apparatus according to another exemplary embodiment of the present invention.

FIG. 4 is a block diagram illustrating an instruction word compression apparatus according to an exemplary embodiment of the present invention.

Referring to FIG. 4, the instruction word compression apparatus according to the exemplary embodiment of the present invention includes an indication code generation unit 410, an instruction word compression unit 420, and an instruction word conversion unit 430.

The indication code generation unit 410 sequentially generates indication codes which correspond to each parallel functional units to simultaneously execute instruction words in a VLIW computer.

In this instance, a size of the indication code is required to be equal to a size capable of corresponding to each of the parallel functional units. When sixteen parallel functional units exist, a size of the indication code is required to be four bits.

The instruction word compression unit 420 sequentially generates an instruction word set which exclusively includes an effective instruction word with respect to each of instruction word groups to be executed in the VLIW computer.

The instruction word conversion unit 430 converts the effective instruction words to include the indication code sequentially. The effective instruction words are in the instruction word set.

In this instance, the instruction word conversion unit 430 converts the effective instruction words to include the indication code sequentially by considering operational capability of a functional unit correspond to indication code and a type of the effective instruction word.

If the indication code is two bits, a functional unit corresponding to an indication code "01" is capable of all types of operations, a functional unit corresponding to an indication code "00" is capable of four arithmetical operations, and a first effective instruction order in an instruction word group is a "comparing" operation, then the instruction word conversion unit 430 may assign the indication code "01" in the first effective instruction word, instead of the indication code "00".

Figure 5:
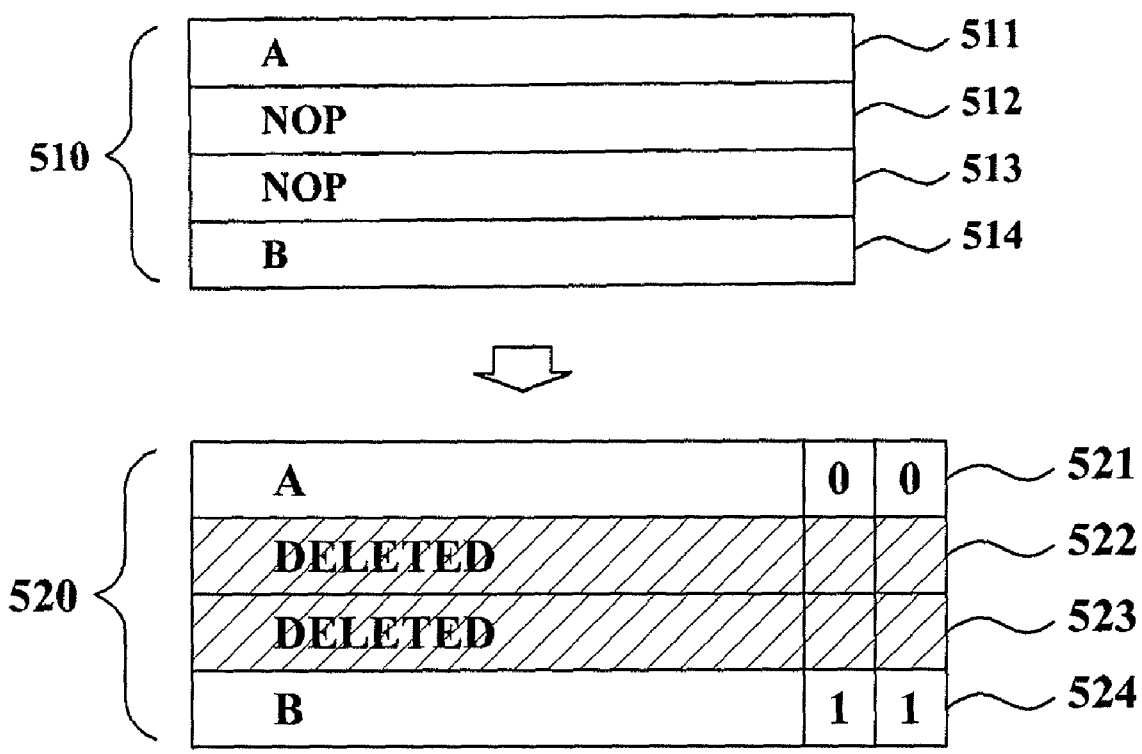
FIG. 5 is a diagram illustrating operations where an instruction word group is compressed by an instruction word compression apparatus according to another exemplary embodiment of the present invention.

FIG. 5 is a diagram illustrating operations where an instruction word group 510 is compressed by an instruction word compression apparatus according to another exemplary embodiment of the present invention.

Referring to FIG. 5, the instruction word group 510 includes four instruction words 511, 512, 513, and 514.

An instruction word compression unit generates an instruction word set which exclusively includes effective instruction words 511 and 514 sequentially.

An instruction word conversion unit assigns an indication code "00" to the first effective instruction word 511 to generate a first converted effective instruction word 521.

The instruction word conversion unit assigns an indication code "11" to the fourth effective instruction word 514 to generate a second converted effective instruction word 524.

The indication code "11" indicates that the instruction word 514 is the fourth of the instruction set 510.

The instruction word group 510 is converted to an instruction word set 520 by being putted into the instruction word compression word unit and the instruction word conversion unit.

The converted instruction word set 520 excludes two NOP 522 and 523.

In this instance, the instruction word conversion unit may assign an indication code in the effective instruction word, the indication code reflecting order relations in the instruction word group.

Figure 6:
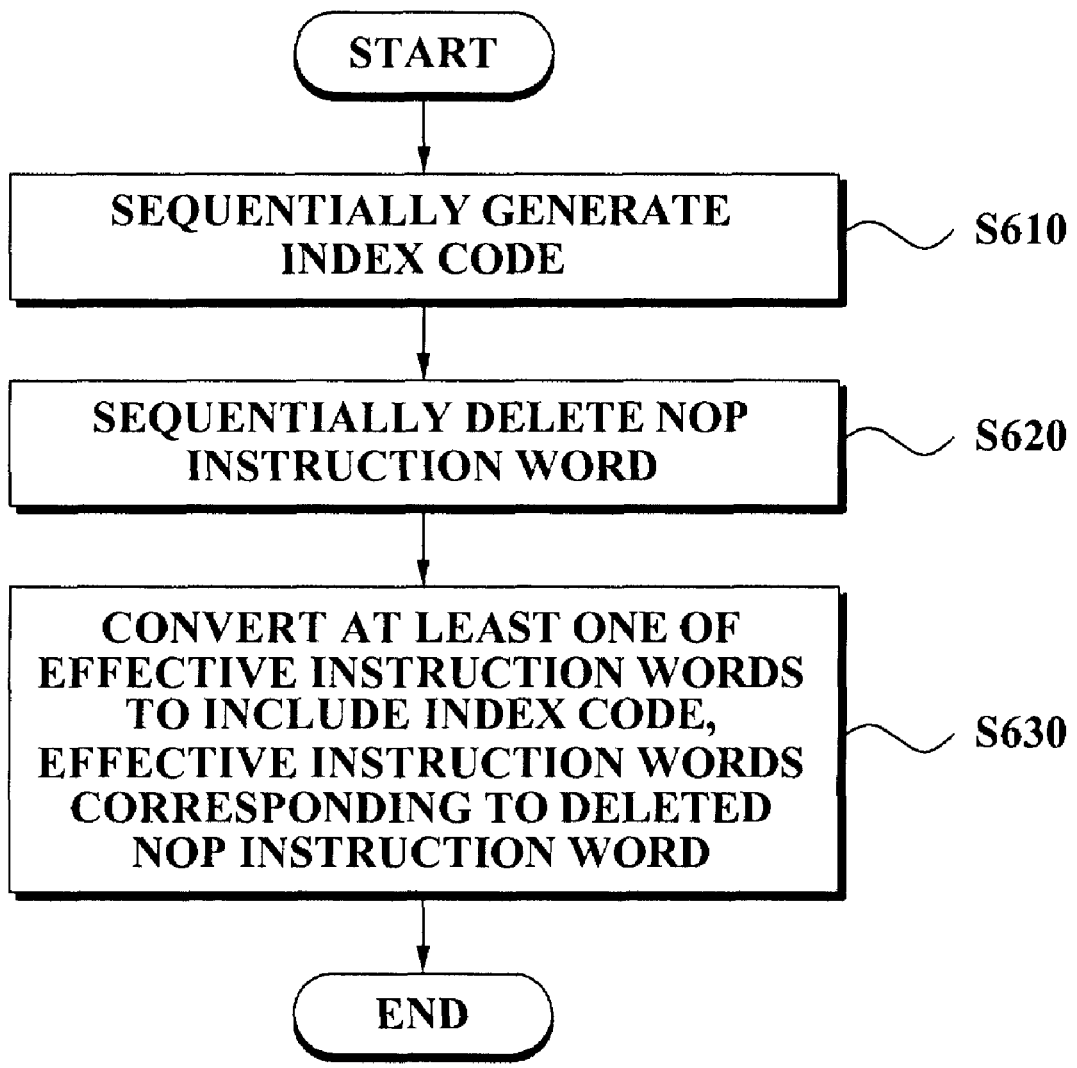
FIG. 6 is a flowchart illustrating an instruction word compression method according to an exemplary embodiment of the present invention.

FIG. 6 is a flowchart illustrating an instruction word compression method according to an exemplary embodiment of the present invention.

Referring to FIG. 6, in operation S610, the instruction word compression method according to an exemplary embodiment of the present invention sequentially generates an index code, which is associated with a number of NOP instruction words between effective instruction words, with respect to each of instruction word groups to be executed in a VLIW computer.

The VLIW computer has a computer architecture capable of reducing total execution time of instruction by including functional units to simultaneously execute instruction words, and by distributing input instruction words to functional units.

A number of instruction words is determined by a number of the functional units, and a number of effective instruction words that can be simultaneously executed at each execution time, may be less than an ideal maximum number due to dependency between input effective instruction words.

In this instance, an instruction word group consisting of instruction words being simultaneously executed at each execution time may exist, a number of effective instruction words being less than an ideal maximum number due to the dependency may be included, and the NOP instruction words may be included in remaining space.

In operation S620, the instruction word compression method according to an exemplary embodiment of the present invention sequentially deletes the NOP instruction words which correspond to the index code with respect to each of the instruction word groups.

In this instance, each of the instruction word groups having deleted NOP instruction words may include fewer instruction words than initial instruction word groups.

In this instance, the number of the NOP instruction words being associated with the index code may be limited by a size of the index code.

When the index code consists of two bits, a number of NOP instruction words that can be indicated by the index code may range from zero to three.

In this instance, since the sequentially deleted NOP instruction words are limited to the index code, the NOP instruction words may be deleted within a range that the index code indicates.

When five NOP instruction words exist between the effective instruction words, and when the number of the NOP instruction words that can be indicated by the index code ranges from zero to three, the sequentially deleted NOP instruction words correspond to an initial three NOPs from a head, and a final two NOPs from a tail remain.

In operation S630, the instruction word compression method according to an exemplary embodiment of the present invention converts the effective instruction words to include the index code, the effective instruction words corresponding to the NOP instruction words.

In this instance, the number of the NOP instruction words associated with the index code may be limited by a size of the index code.

In this instance, the converting of the effective instruction words to include the index code comprises converting a remaining NOP to include a predetermined index code, the reaming NOP remains after the sequential deletion of NOPs.

When five NOP instruction words exist between the effective instruction words, and when the number of the NOP instruction words that can be indicated by the index code ranges from zero to three, the sequentially deleted NOP instruction words correspond to an initial three NOPs from a head, and a final two NOPs from a tail remain.

The converting of the effective instruction words to include the index code assigns index codes to each of two remaining NOPs.

The assigned index codes may have value indicates that there is no NOP.

In this instance, the converting of the effective instruction words to include the index code assigns an index code to the effective index code, the effective index code is located prior to the deleted NOPs.

The converting of the effective instruction words to include the index code assigns the index code to a first effective instruction word, the first effective instruction word exists prior to the deleted three NOPs, when the three NOPs between the first effective instruction word and a second effective instruction word are having been deleted.

In this instance, a maximum number of instruction word groups is equal to a maximum number of instruction words that can be simultaneously executed in the computer.

The VLIW computer has a computer architecture capable of reducing total execution time of instruction by including functional units to simultaneously execute instruction words, and by distributing input instruction words to functional units.

A number of instruction words that can be simultaneously executed in the VLIW computer is determined by a number of functional units.

In this instance, the index code may include a predetermined code which corresponds to a case that all remaining instruction words are NOP instruction words.

As an example, when the index code consists of two bits, and when the index code has a value of "01", this denotes that instruction words existing after the effective instruction words in the instruction word group are NOP instruction words.

In this instance, a size of the index code may be previously determined based on at least one of an architecture of an instruction word and an operation environment of the computer.

The size of the index code may be previously determined before the instruction word is executed.

The size of the index code may be previously determined based on a size of the instruction word or a size of each area being allocated to within the instruction word.

In this instance, the converting of the effective instruction words to include the index code may substitute a part of the effective instruction words with the index code.

The converting of the effective instruction words to include the index code may substitute a part of the effective instruction words with the index code, the part of the effective instruction words being not used.

Methods of compressing are the same as the descriptions given above with reference to FIGS. 2 and 3 and therefore, detailed descriptions there of will be omitted.

Figure 7:
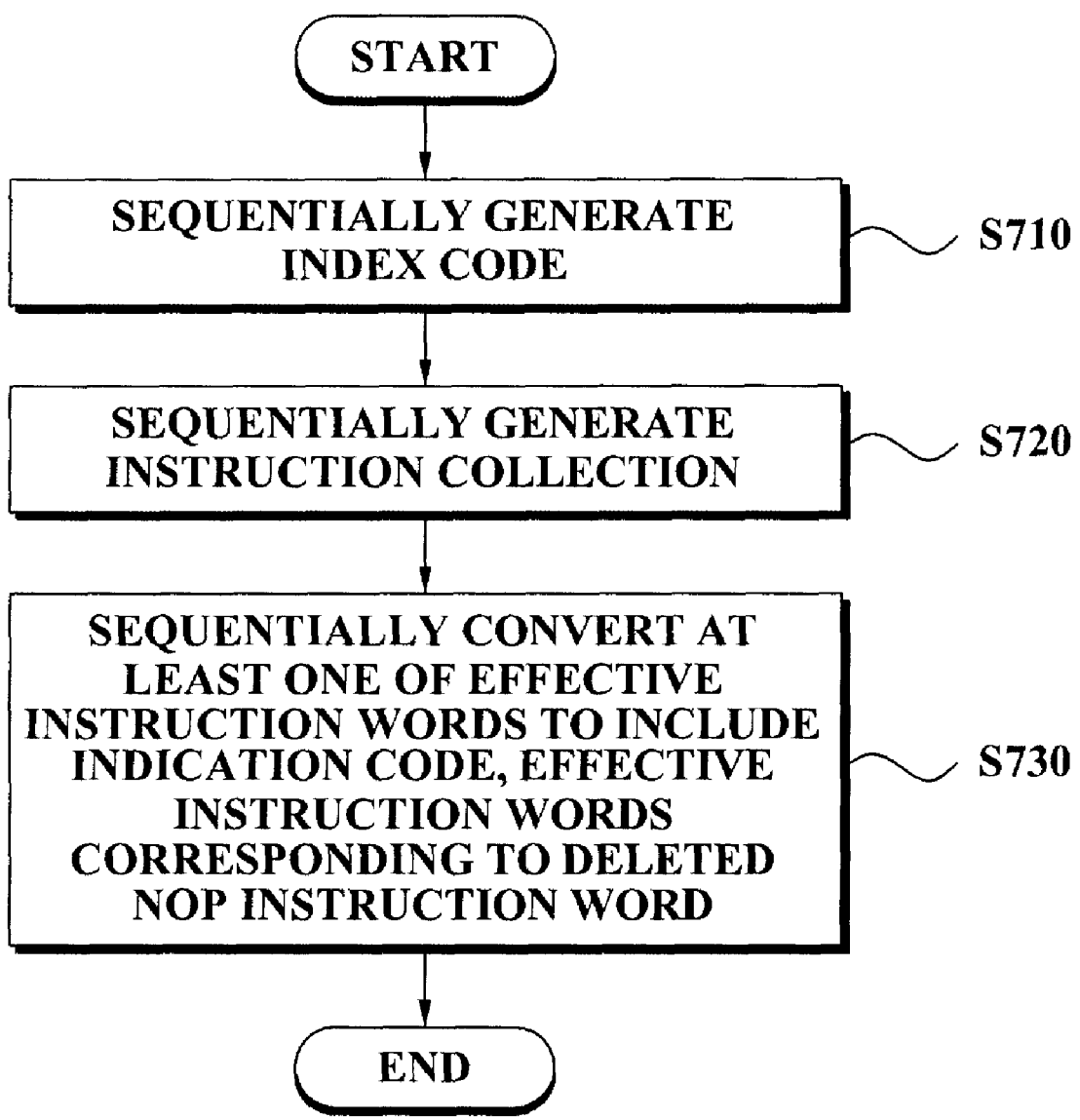
FIG. 7 is a flowchart illustrating an instruction word compression method according to another exemplary embodiment of the present invention.

FIG. 7 is a flowchart illustrating an instruction word compression method according to an exemplary embodiment of the present invention.

Referring to FIG. 7, in operation S710, the instruction word compression method according to another exemplary embodiment sequentially generates indication codes which correspond to each parallel functional unit to simultaneously execute instruction words in a VLIW computer.

In this instance, a size of the indication code is required to be equal to a size capable of corresponding to each of the parallel functional units. When sixteen parallel functional units exist, a size of the indication code is required to be four bits.

In operation S720, the instruction word compression method according to the current exemplary embodiment sequentially generates an instruction word set which exclusively include an effective instruction word with respect to each of instruction word groups to be executed in the VLIW computer.

In operation S730, the instruction word compression method according to the current exemplary embodiment sequentially converts each of the effective instruction words of the instruction word set to include the indication code.

In this instance, the sequentially converting of each of the effective instruction words of the instruction word set to include the indication code may convert each of the effective words to include the indication code by considering operational capability of a functional unit corresponding to each of the indication codes and a type of the effective instruction word.

When an indication code is two bits, when a functional unit corresponding to an indication code "01" is capable of all types of operations, when a functional unit corresponding to an indication code "00" is capable of four arithmetical operations, and when a first effective instruction order in an instruction word group is a comparing operation, the instruction word conversion unit 430 may include the indication code "01" in the first effective instruction word, instead of the indication code "00".

FIG. 5 is a diagram illustrating operations where an instruction word group 510 is compressed by an instruction word compression method according to another exemplary embodiment of the present invention.

Referring to FIG. 5, the instruction word group 510 includes four instruction words 511, 512, 513, and 514.

The sequentially generating an instruction word set generates an instruction word set which exclusively includes effective instruction words 511 and 514 sequentially.

The sequentially converting each of the effective instruction words assigns an indication code "00" to the first effective instruction word 511 to generate a first converted effective instruction word 521.

The sequentially converting each of the effective instruction words assigns an indication code "11" to the fourth effective instruction word 514 to generate a second converted effective instruction word 524.

The indication code "11" indicates that the instruction word 514 is the fourth of the instruction set 510.

After operations of the sequentially generating of the instruction word set and the sequentially converting of each of the effective instruction words of the instruction word set to include the indication code, the instruction word group 510 is converted to the instruction word set 520.

The converted instruction word set 520 excludes two NOP 522 and 523.

In this instance, the sequentially converting of each of the effective instruction words of the instruction word set to include the indication code may include the indication code in the effective instruction word, the indication code reflecting order relations in the instruction word group.

The instruction word compression method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided an instruction word compression unit and an instruction word compression method which can reduce a storage space for an instruction, without requiring an additional storage space or an additional circuit logic.

According to the present invention, with respect to a parallel processing VLIW computer, an optimized instruction word set may be acquired by performance of a parallel function apparatus.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for compressing instruction words, comprising:
    an index code generation unit which generates an index code for an effective instruction word of a very long instruction word (VLIW) instruction based on a number of consecutive no operation (NOP) instruction words up to a predetermined number N, the consecutive NOP instruction words being to be executed by a same functional unit of a plurality of functional units of a VLIW computer as the effective instruction after the execution of the effective instruction word;
    an instruction compression unit which deletes M number of the consecutive NOP instruction words, M being no greater than N;
    an instruction word conversion unit which converts the effective instruction word to include the index code; and
    a remaining NOP manipulator which converts a remaining NOP instruction word to include a predetermined constant index code which is independent of a number of consecutive NOP instruction words after the remaining NOP instruction word, the remaining NOP instruction word being a consecutive NOP instruction word after an N'th consecutive instruction, if the number of the consecutive NOP instruction words is greater than the predetermined N.

2. The apparatus of claim 1, wherein the instruction word conversion unit converts an effective instruction word to be executed before a deleted NOP instruction word to include the index code.

3. The apparatus of claim 1, wherein the index code generation unit generates a second predetermined constant index code if all of the consecutive NOP instruction words to be executed by the same functional unit as the effective instruction after the execution of the effective instruction word are NOP instruction words.

4. The apparatus of claim 1, wherein a size of the index code is determined based on at least one of an architecture of an instruction word and an operation environment of the VLIW computer.

5. The apparatus of claim 1, wherein the instruction conversion unit substitutes a part of the effective instruction word with the index code.

6. An instruction word compression apparatus, comprising:
   an instruction word compression unit which generates an instruction word set which includes an effective instruction word and excludes an NOP instruction word among consecutive instruction words to be executed by a same functional unit of a plurality of functional unit of a very long instruction word (VLIW) computer; and
   an instruction word conversion unit which converts the effective instruction word of the instruction word set to include an indication code which reflects an order of the effective instruction in the consecutive words.

7. The apparatus of claim 6, wherein the indication code further reflects at least one of operational capability of the functional unit of the plurality of functional units and a type of the effective instruction words.

8. An instruction word compression method, comprising:
   generating an index code for an effective instruction word of a very long instruction word (VLIW) instruction based on a number of consecutive no operation (NOP) instruction words up to a predetermined number N, the consecutive NOP instruction words being to be executed by a same functional unit of a plurality of functional units of a VLIW computer as the effective instruction after the execution of the effective instruction word;
   deleting M number of the consecutive NOP instruction words, M being no greater than N;
   converting the effective instruction word to include the index code; and
   converting a remaining NOP instruction word to include a predetermined constant index code which is independent of a number of consecutive NOP instruction words after the remaining NOP instruction word, the remaining NOP instruction word being a consecutive NOP instruction word after an N'th consecutive instruction, if the number of consecutive NOP instruction is greater than the predetermined N.

9. The method of claim 8, wherein the effective instruction word to be executed before a deleted NOP instruction word is converted to include the index code.

10. The method of claim 8, further comprising:
    generating a second predetermined constant index code if all of the consecutive NOP instruction words to be executed by the same functional unit as the effective instruction after the execution of the effective instruction word are NOP instruction words.

11. The method of claim 8, wherein a size of the index code is determined based on at least one of an architecture of an instruction word and an operation environment of the VLIW computer.

12. The method of claim 8, wherein the converting the at least one effective instruction word to include the index code comprises substituting a part of the at least one effective instruction word with the index code.

13. An instruction word compression method, comprising:
    generating an instruction word set which includes an effective instruction word and excludes an NOP instruction word among consecutive instruction words to be executed by a same functional unit of a plurality of functional units of a very long instruction word (VLIW) computer; and
    converting the effective instruction word of the instruction word set to include an indication code which reflects an order of the effective instruction in the consecutive instruction words.

14. The method of claim 13, wherein the indication code further reflects at least one of an operational capability of the same functional unit of the plurality of functional units and a type of the effective instruction word.

15. A computer-readable storage medium storing software instructions adapted to enable a computer to compress an instruction word, the software instructions comprising:
    generating an instruction word set which includes an effective instruction word and excludes an NOP instruction word among consecutive instruction words to be executed by a same functional unit of a plurality of functional units of a very long instruction word (VLIW) computer, and
    converting the effective instruction word of the instruction word set to include an indication code which reflects an order of the effective instruction in the consecutive instruction words.

\* \* \* \* \*